(12) United States Patent
Ihori et al.

(10) Patent No.: US 8,167,694 B2
(45) Date of Patent: May 1, 2012

(54) MESSAGE OUTPUT DEVICE, WHEREIN THE MESSAGE HAS A LIFE DURATION

(75) Inventors: Satoshi Ihori, Minato-ku (JP); Shinya Fujimatsu, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 426 days.

(21) Appl. No.: 10/585,706

(22) PCT Filed: Jan. 13, 2005

(86) PCT No.: PCT/JP2005/000309
§ 371 (c)(1),
(2), (4) Date: Jul. 10, 2006

(87) PCT Pub. No.: WO2005/068033
PCT Pub. Date: Jul. 28, 2005

(65) Prior Publication Data
US 2007/0111771 A1      May 17, 2007

(30) Foreign Application Priority Data

Jan. 14, 2004    (JP) .................................. 2004-006707

(51) Int. Cl.
*A63F 9/00*      (2006.01)
(52) U.S. Cl. .......................................................... 463/8
(58) Field of Classification Search ........................ 463/8
See application file for complete search history.

(56) References Cited

U.S. PATENT DOCUMENTS

| | | | | |
|---|---|---|---|---|
| 5,663,717 A | * | 9/1997 | DeLuca | 340/825.36 |
| 5,729,540 A | * | 3/1998 | Wegrzyn | 370/336 |
| 6,241,524 B1 | * | 6/2001 | Aoshima et al. | 434/118 |
| 6,358,150 B1 | * | 3/2002 | Mir et al. | 463/28 |
| 6,501,733 B1 | * | 12/2002 | Falco et al. | 370/235 |
| 6,694,345 B1 | * | 2/2004 | Brelsford et al. | 718/100 |
| 6,793,575 B2 | * | 9/2004 | Brown et al. | 463/6 |
| 6,820,263 B1 | * | 11/2004 | Klappholz | 718/108 |
| 6,850,994 B2 | * | 2/2005 | Gabryjelski | 710/19 |
| 6,896,180 B2 | * | 5/2005 | Miodunski et al. | 235/379 |
| 2001/0014621 A1 | * | 8/2001 | Okubo et al. | 463/35 |
| 2002/0094866 A1 | * | 7/2002 | Takeda et al. | 463/35 |
| 2002/0132658 A1 | * | 9/2002 | Brown et al. | 463/16 |
| 2003/0013533 A1 | * | 1/2003 | Uenishi et al. | 463/43 |
| 2003/0084255 A1 | * | 5/2003 | Suzuki et al. | 711/150 |

(Continued)

FOREIGN PATENT DOCUMENTS

JP    10-137444    5/1998

(Continued)

*Primary Examiner* — Melba Bumgarner
*Assistant Examiner* — Seng H Lim
(74) *Attorney, Agent, or Firm* — Howard & Howard Attorneys PLLC

(57) ABSTRACT

A battle situation detection unit (205) detects progress status of a battle controlled by a battle control unit (204) and winning and losing statuses of friend and enemy sides. An audio data acquisition unit (209) acquires audio data specified based on the progress status of the battle. The audio data acquisition unit (209) detects winning and losing statuses of the friend and enemy sides at each predetermined timing, and acquires arbitrary matching audio data based on the detected winning and losing statuses. The audio data acquisition unit 209 sends the acquired audio data together with priority orders to a queue buffer (210). An audio output unit (212) reads out the audio data from the queue buffer (210) according to the priority orders, synthesizes an audio signal from the read-out audio data, and outputs audios from a predetermined speaker.

5 Claims, 7 Drawing Sheets

| DATA ID | PRIORITY ORDER | LIFE DURATION TIME | CONTENT | ... |
|---|---|---|---|---|
| 234567 | 5 | 1.5 | "WE CAN GO ON!" | ... |
| 234578 | 4 | 2.0 | "THEY'VE GOT QUITE A SKILL!" | ... |
| 234579 | 6 | 3.0 | "IT FEELS LIKE WE'RE GETTING INTO THE SWING OF IT!" | ... |
| 234580 | 5 | 1.5 | "OH MY GOSH!" | ... |
| 234581 | 4 | 3.0 | "WE CAN'T CATCH UP!" | ... |
| 234582 | 6 | 2.0 | "THE DRILLS ARE PAYING OFF!" | ... |
| ⋮ | ⋮ | ⋮ | ⋮ | ⋮ |

U.S. PATENT DOCUMENTS

| | | | |
|---|---|---|---|
| 2003/0097496 A1* | 5/2003 | Gabryjelski | 710/15 |
| 2003/0126265 A1* | 7/2003 | Aziz et al. | 709/227 |
| 2003/0137690 A1* | 7/2003 | Hoover et al. | 358/1.15 |
| 2003/0139209 A1* | 7/2003 | Nakayama | 463/6 |
| 2005/0101386 A1* | 5/2005 | Lavanchy et al. | 463/42 |
| 2006/0053425 A1* | 3/2006 | Berkman et al. | 719/313 |

FOREIGN PATENT DOCUMENTS

| | | |
|---|---|---|
| JP | 11-253659 | 9/1999 |
| JP | 2003/019355 | 1/2003 |
| JP | 2003/210832 | 7/2003 |
| JP | 2003/290549 | 10/2003 |

* cited by examiner

| DATA ID | PRIORITY ORDER | LIFE DURATION TIME | CONTENT | ... |
|---|---|---|---|---|
| 123456 | 1 | — | "TIME'S UP IN FIVE MINUTES!" | ... |
| 123457 | 2 | — | "ENEMY VEHICLE GOES SOUTH!" | ... |
| 123458 | 1 | — | "OUR BUDDY'S SHOT DOWN ENEMY PLANE!" | ... |
| ⋮ | ⋮ | ⋮ | ⋮ | ⋮ |

FIG. 4A

| DATA ID | PRIORITY ORDER | LIFE DURATION TIME | CONTENT | ... |
|---|---|---|---|---|
| 234567 | 5 | 1.5 | "WE CAN GO ON!" | ... |
| 234578 | 4 | 2.0 | "THEY'VE GOT QUITE A SKILL!" | ... |
| 234579 | 6 | 3.0 | "IT FEELS LIKE WE'RE GETTING INTO THE SWING OF IT!" | ... |
| 234580 | 5 | 1.5 | "OH MY GOSH!" | ... |
| 234581 | 4 | 3.0 | "WE CAN'T CATCH UP!" | ... |
| 234582 | 6 | 2.0 | "THE DRILLS ARE PAYING OFF!" | ... |
| ⋮ | ⋮ | ⋮ | ⋮ | ⋮ |

FIG. 4B

MESSAGE OUTPUT DEVICE, WHEREIN THE MESSAGE HAS A LIFE DURATION

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

1. Technical Field

The present invention relates to a message output device and a message control method suitable for easily notifying the winning and losing statuses of opposing parties, a program for realizing these on a computer, and a computer-readable information recording medium storing the program.

2. Background of the Invention

Conventionally, various games (software, etc.) to be executed on a video game apparatus, etc. have been created. Recently, games categorized as flight combat action game have been popular.

This flight combat action game is a game of a type in which, for example, a player controls a warplane and clears his/her mission while fighting against enemy warplanes, etc. in a virtual world (in a virtual space). Further, in a flight combat action game, there are many cases where battles are fought in groups between a plurality of friend warplanes (friend warplane group) and a plurality of enemy warplanes (enemy warplane group). In such a group battle, the speeches of other pilots (conversations between one and his/her friend or between enemies, etc.) are output acoustically or in similar manners, giving reality and live sense to the player.

As examples of games of this type, a flight simulation apparatus for realizing flight simulations (for example, see Patent Literature 1), and techniques for a simulation game for realizing battle simulations (for example, see Patent Literature 2) have also been disclosed.

Patent Literature 1: Unexamined Japanese Patent Application KOKAI Publication No. H10-137444 (pp. 4-9, FIG. 1)

Patent Literature 2: Unexamined Japanese Patent Application KOKAI Publication No. 2003-19355 (pp. 5-11, FIG. 6)

Furthermore, in sports action games, etc. for football, baseball, etc. played in teams, the speeches of other players are output acoustically or in similar manners, giving reality and live sense to the player.

BRIEF SUMMARY OF THE INVENTION

Problem to be Solved by the Invention

However, since similar lines are generally output at predetermined timings as the speeches in such a flight combat action game, etc. as described above, the reality and live sense often wear off as the player repeats the game.

Further, in a flight combat action game, it is difficult for the player to grasp the winning and losing statuses of his/her side and the opposing side along with the progress of the game. This is because, unlike sports action games, etc., the whole war situation is essentially hard to catch since each warplane attacks different enemy or target. Besides, only plane shadows, etc. by radar are displayed on the game screen of the player, providing scarce resource for determining whether his/her side is winning or losing.

Therefore, even in a case where the winning and losing statuses of the opposing parties change like a swinging pendulum as the game progresses, the player cannot know the changes, thus cannot feel the excitement originally promised by a flight combat action game.

The present invention was made in view of the above-described circumstance, and an object of the present invention is to provide a message output device and a message control method capable of easily notifying the winning and losing statuses of the opposing parties, a program for realizing these on a computer, and a computer-readable information recording medium storing the program.

Means for Solving the Problem

A message output device according to a first aspect of the present invention comprises a battle control unit, a message storage unit, a winning and losing status detection unit, a message acquisition unit, and a message output unit, which are configured as follows.

First, the battle control unit controls a battle between characters (for example, a plurality of warplanes) belonging to opposing friend and enemy sides in a virtual space based on a predetermined instruction input. The message storage unit stores a plurality of messages (for example, speeches) matching winning and losing statuses of the friend and enemy sides. The winning and losing status detection unit detects winning and losing statuses of the friend and enemy sides which change in accordance with progress of the battle controlled, at each predetermined timing.

The message acquisition unit acquires a message matching the detected winning and losing statuses. The message output unit outputs the acquired message, by, for example, audios, etc.

In this way, messages matching the winning and losing statuses of the friend and enemy sides are output sequentially, by, for example, audios, etc. As a result, it is possible to easily notify the winning and losing statuses of the friend and enemy sides. And it is possible to give the player more reality and live sense.

A message output device according to a second aspect of the present invention comprises a battle control unit, a message storage unit, a main message acquisition unit, a sub message acquisition unit, and a message output unit, which are configured as follows.

First, the battle control unit controls a battle between characters (for example, a plurality of warplanes) belonging to opposing friend and enemy sides in a virtual space based on a predetermined instruction input. The message storage unit stores a plurality of main messages matching progress statuses of the battle, and a plurality of sub messages matching winning and losing statuses of the friend and enemy sides.

The main message acquisition unit acquires a main message specified in accordance with progress of the battle controlled. The sub message acquisition unit detects winning and losing statuses of the friend and enemy sides which change in accordance with the progress of the battle controlled at each predetermined timing, and acquires an arbitrary sub message matching the detected winning and losing statuses. The message output unit outputs the acquired main message and sub message based on a predetermined condition, by, for example, audios, etc.

In this way, main messages matching the progress status and sub messages matching the winning and losing statuses of the friend and enemy sides are sequentially output by, for example, audios, etc. That is, the player grasps the progress status of the battle by hearing the main messages and grasps the wining and losing statuses of the friend and enemy sides by hearing the sub messages.

As a result, it is possible to easily notify the progress status of the battle together with the winning and losing statuses of the friend and enemy sides. And it is possible to give the player more reality and live sense.

In a case where the main message and the sub message are acquired at a same time, the message output unit may output the main message preferentially.

In this case, it is possible to notify the main message matching the progress status, which counts more, preferentially over the sub message matching the winning and losing statuses of the friend and enemy sides.

In the message output device described above, a priority order may be set for each main message and each sub message, and the message output unit may output the acquired main message and sub message in an order based on the priority orders.

For example, the main message acquisition unit and the sub message acquisition unit store each acquired message in a predetermined buffer, and the message output unit outputs the main message and sub message stored in the buffer in an order based on the priority orders.

In this case, the main message and sub message stored in the buffer are output by audios, etc. based on the priority orders. For example, it is possible to notify the main message matching the progress status, which counts more, preferentially over the sub message matching the winning and losing statuses of the friend and enemy sides.

In the message output device described above, a life duration time may be set at least for each sub message, and the message output device may further comprise a message deletion unit which deletes any sub message whose life duration time has passed among the sub messages acquired. For example, the main message acquisition unit and the sub message acquisition unit store each acquired message in a predetermined buffer, and the message deletion unit deletes any sub message whose life duration time has passed from the buffer.

In this case, any sub message whose life duration time has passed is deleted without its audios being output. Therefore, it is possible to prevent unnecessary retention of the sub messages.

A message control method according to a third aspect of the present invention is a message control method which utilizes a message storage unit which stores a plurality of main messages matching progress statuses of a battle, and a plurality of sub messages matching winning and losing statuses of the battle, and comprises a battle controlling step, a main message acquiring step, a sub message acquiring step, and a message outputting step, which are configured as follows.

First, at the battle controlling step, a battle between characters (for example, a plurality of warplanes) belonging to opposing friend and enemy sides in a virtual space are controlled based on a predetermined instruction input. At the main message acquiring step, a main message specified in accordance with progress of the battle controlled is acquired.

At the sub message acquiring step, winning and losing statuses of the battle which change in accordance with the progress of the battle controlled are detected at each predetermined timing, and an arbitrary sub message matching the detected winning and losing statuses are acquired. At the message outputting step, the acquired main message and sub message are output by, for example, audios, etc. based on a predetermined condition.

In this way, the main message matching the progress status and the sub message matching the winning and losing statuses of the friend and enemy sides are sequentially output by, for example, audios, etc. That is, the player grasps the progress status of the battle by hearing the main message, and grasps the winning and losing statuses of the friend and enemy sides by hearing the sub message.

As a result, it is possible to easily notify the progress status of the battle, and the winning and losing statuses of the friend and enemy sides. And it is possible to give the player more reality and live sense.

A program according to a fourth aspect of the present invention is configured to control a computer (including an electronic appliance) to function as the message output device described above.

The program may be stored in a computer-readable information recording medium such as a compact disk, a flexible disk, a hard disk, a magneto optical disk, a digital video disk, a magnetic tape, a semiconductor memory, etc.

The program described above may be distributed and sold through a computer communication network independently from a computer on which the program will be executed. The information recording medium described above may be distributed and sold independently from the computer.

Effect of the Invention

According to the present invention, it is possible to easily notify the winning and losing statuses of the friend and enemy sides. And it is possible to give the player more reality and live sense.

BRIEF DESCRIPTION OF THE DRAWINGS

FIG. 4A is an exemplary diagram showing an example of audio data for notifying progress status of a battle.

FIG. 4B is an exemplary diagram showing an example of audio data for notifying winning and losing statuses of friend and enemy sides.

Explanation of Reference Numerals

Figure 1:
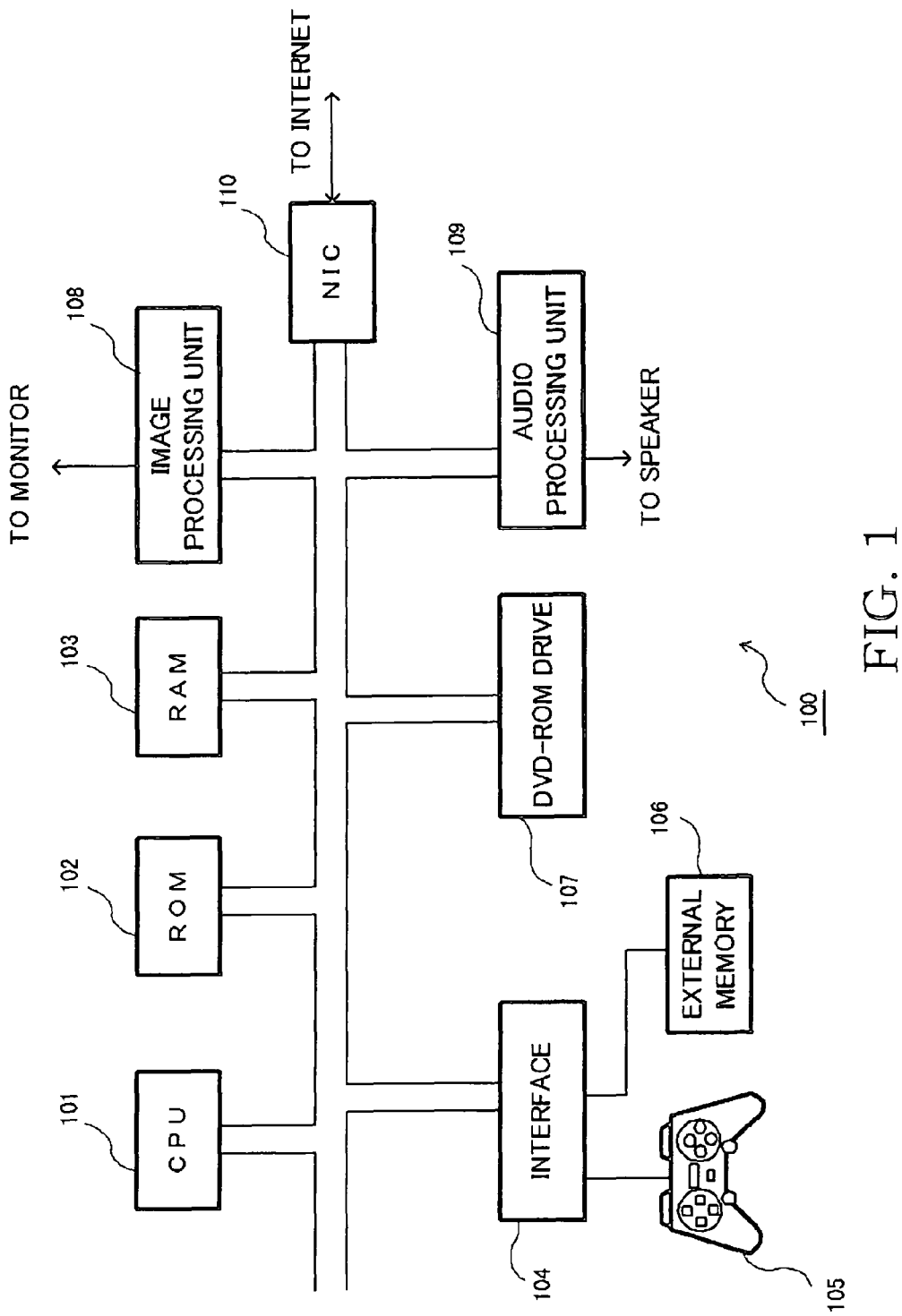
FIG. 1 is an exemplary diagram showing a schematic structure of a typical game apparatus on which a message output device according to an embodiment of the present invention is realized.

100 game apparatus
101 CPU
102 ROM
103 RAM
104 interface
105 controller
106 external memory
107 DVD-ROM drive
108 image processing unit
109 audio processing unit 110 NIC
200, 400 message output device
201 warplane information storage unit
202 virtual space information storage unit
203 operation input reception unit
204 battle control unit
205 battle situation detection unit
206 image generation unit
207 image display unit
208 audio data storage unit
209 audio data acquisition unit
210 queue buffer
211 life duration management unit
212 audio output unit
401 character string data storage unit
402 character image synthesis unit

DETAILED DESCRIPTION OF THE INVENTION

Best Mode for Carrying Out the Invention

The embodiments of the present invention will be explained below. To facilitate understanding, embodiments in which the present invention is applied to a game apparatus will be explained below, but the present invention can be applied likewise to information processing apparatuses such as computers of various types, PDAs, cellular phones, etc. That is, the embodiments to be explained below are intended for illustration, and not to limit the scope of the present invention. Accordingly, though those skilled in the art could employ embodiments in which individual elements or all the elements of the present embodiments are replaced with equivalents of those, such embodiments are also included in the scope of the present invention.

Embodiment 1

FIG. 1 is an exemplary diagram showing a schematic structure of a typical game apparatus on which a message output device according to an embodiment of the present invention is realized. The following explanation will be made with reference to this drawing.

The game apparatus 100 comprises a CPU (Central Processing Unit) 101, a ROM (Read Only Memory) 102, a RAM (Random Access Memory) 103, an interface 104, a controller 105, an external memory 106, a DVD (Digital Versatile Disk)-ROM drive 107, an image processing unit 108, an audio processing unit 109, and an NIC (Network Interface Card) 110.

A DVD-ROM storing a program and data for a game is attached to the DVD-ROM drive 107 and the power of the game apparatus 100 is turned on, thereby the program is executed and the message output device according to the present embodiment is realized.

The CPU 101 controls the whole operation of the game apparatus 100, and is connected to each structural component to exchange control signals and data.

The ROM 102 stores an IPL (Initial Program Loader) to be executed immediately after the power is turned on, upon execution of which a program stored in a DVD-ROM is read into the RAM 103 and the CPU 101 starts executing the program. Further, the ROM 102 stores a program for an operating system and various data necessary for controlling the operation of the whole game apparatus 100.

The RAM 103 is for temporarily storing data and programs, and a program and data read out from a DVD-ROM, and other data necessary for the progress of the game or chat communications are retained therein.

The controller 105 connected via the interface 104 receives an operation input given by the user when he/she is playing the game. The controller 105 includes direction keys, selection keys, etc.

The external memory 106 connected detachably via the interface 104 rewritably stores data indicating the progress status of the game, log (record) data of chat communications, etc. The user can store such data in the external memory 106 at desired timings by giving an instruction input via the controller 105.

A DVD-ROM to be attached to the DVD-ROM drive 107 stores a program for realizing a game, and image data and audio data accompanying the game. Under the control of the CPU 101, the DVD-ROM drive 107 reads the DVD-ROM attached thereon to read out necessary program and data, which are to be temporarily stored in the RAM 103 or the like.

The image processing unit 108 has the data, which is read out from a DVD-ROM, processed by the CPU 101 and an image processor (not shown) included in the image processing unit 108, and after this, stores the processed data in a frame memory (not shown) included in the image processing unit 108. The image information stored in the frame memory is converted into a video signal at a predetermined synchronization timing and output to a monitor (not shown) connected to the image processing unit 108. Thereby, image displays of various types become available.

Note that the image processor can rapidly perform transparent operations such as overlay operation or ox blending of two-dimensional images, and saturate operations of various types.

Further, the image processor can also rapidly perform an operation for rendering, by a Z buffer method, polygon information placed in a virtual three-dimensional space and having various texture information added, to obtain a rendered image of the polygon placed in the virtual three-dimensional space as seen from a predetermined view position.

The audio processing unit 109 converts audio data read out from a DVD-ROM into an analog audio signal, and outputs the signal from a speaker (not shown) connected thereto. Further, under the control of the CPU 101, the audio processing unit 109 generates sound effects and music data to be sounded in the course of a game, and outputs the sounds corresponding to the data from the speaker.

The NIC 110 is for connecting the game apparatus 100 to a computer communication network (not shown) such as the Internet, etc., and comprises a 10BASE-T/100BASE-T product used for building a LAN (Local Area Network), an analog modem, an ISDN (Integrated Services Digital Network) modem, or an ADSL (Asymmetric Digital Subscriber Line) modem for connecting to the Internet by using a telephone line, a cable modem for connecting to the Internet by using a cable television line, or the like, and an interface (not shown) for intermediating between these and the CPU 101.

Aside from the above, the game apparatus 100 may be configured to perform the same functions as the ROM 102, the RAM 103, the external memory 106, a DVD-ROM to be attached on the DVD-ROM drive 107, etc. by using a large-capacity external storage device such as a hard disk, etc.

Further, it is also possible to employ an embodiment where a keyboard for accepting a character string editing input from the user, and a mouse for accepting various position designations and selection inputs from the user are connected. Furthermore, a general-purpose personal computer may be used instead of the game apparatus 100 of the present embodiment.

Schematic Structure of Message Output Device

Figure 2:
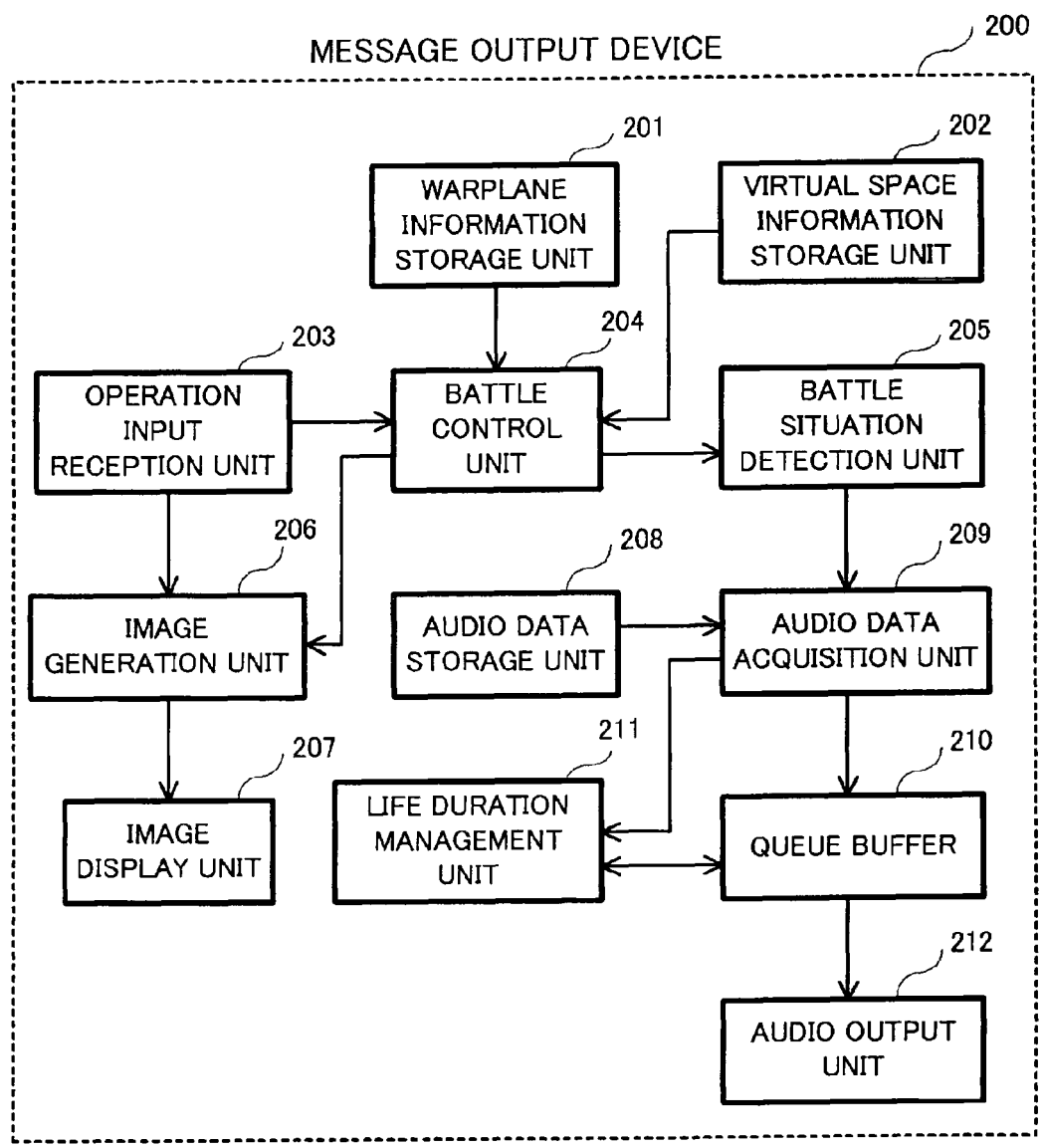
FIG. 2 is an exemplary diagram showing an example of a schematic structure of a message output device according to an embodiment of the present invention.

FIG. 2 is an exemplary diagram showing a schematic structure of a message output device 200 according to the present embodiment. The following explanation will be made with reference to this drawing. The message output device 200 will be explained by employing, as an example, a case where it is applied to a flight combat action game in which battles are fought between warplanes (characters) belonging to opposing parties. That is, the player controls at least one warplane belonging to the friend warplane group, and fights a group battle against the enemy warplane group.

The message output device 200 comprises a warplane information storage unit 201, a virtual space information storage unit 202, an operation input reception unit 203, a battle control unit 204, a battle situation detection unit 205, an image generation unit 206, an image display unit 207, an audio data storage unit 208, an audio data acquisition unit 209, a queue buffer 210, a life duration management unit 211, and an audio output unit 212.

The warplane information storage unit 201 stores information regarding warplanes of both the friend side and enemy side.

For example, the warplane information storage unit 201 stores image data (three-dimensional modeling, texture, etc.), weapon data (kinds of weapons mounted, amount of ammunition, striking accuracy, etc.), and flight performance data (maximum velocity, minimum turning diameter, etc.) for each warplane.

The DVD-ROM attached on the DVD-ROM drive 107, the external memory 106, or the like can function as the warplane information storage unit 201 described above.

The virtual space information storage unit 202 stores various information for building virtual spaces.

For example, the virtual space information storage unit 202 stores information for building virtual spaces made up of airspaces (disposition of clouds, sun, rainbow, etc.) and grounds (mountains, planes, rivers, seas, and constructions disposed there, etc.) flown by each warplane.

The DVD-ROM attached on the DVD-ROM drive 107, the external memory 106, or the like can function as the virtual space information storage unit 202 described above.

The operation input reception unit 203 receives an instruction input given to a warplane originally assigned to the player (or arbitrarily selected by the player).

For example, the operation input reception unit 203 receives flight instructions (increase/decrease altitude, turn left/right, increase/decrease speed, etc.) to the player's warplane and attack instructions (fire a missile or a Vulcan cannon, drop bombs, etc.) toward enemy warplanes or attack targets (enemy facilities, enemy vehicles, etc.).

The controller 105 can function as the operation input reception unit 203 described above.

The battle control unit 204 controls battles between friend warplanes and enemy warplanes flying in a virtual space.

That is, the battle control unit 204 flies the player's warplane (moves the warplane in the virtual space) in accordance with a flight instruction received by the operation input reception unit 203, and flies the other warplanes (the rest of the friend warplanes and enemy warplanes) based on predetermined flight logics. And the battle control unit 204 performs attacks by the player's warplane in accordance with an attack instruction received by the operation input reception unit 203 and measures the striking level of the attacks, and performs attacks by the other warplanes (the rest of the friend warplanes and enemy warplanes) based on predetermined attack logics and measures the striking level of the attacks.

The CPU 101 can function as the battle control unit 204 described above.

The battle situation detection unit 205 detects the status of progresses (presence/absence of situation changes, etc.) of the battles controlled by the battle control unit 204, and the winning and losing statuses of the friend side and the enemy side.

For example, the battle situation detection unit 205 detects changes in the progress status such as occurrence of knocks (falls) of any warplanes on either the friend side or the enemy side, destructions of any destruction targets, and minutely elapse of an imposed time limit. Further, the battle situation detection unit 205 detects winning and losing statuses such as a winning status of the friend side (a losing status of the enemy side), a losing status of the friend side (a winning status of the enemy side), and a balancing status of the friend and enemy sides based on comparison of the numbers of surviving warplanes of the friend and enemy sides, presence or absence of reinforcement warplanes, comparison of the performance of the warplanes, etc.

The CPU 101 can function as the battle situation detection unit 205 described above.

The image generation unit 206 generates images of the virtual space as seen from a viewpoint based on the player's warplane during group battles between the friend warplanes and the enemy warplanes in real time.

For example, the image generation unit 206 sequentially generates images of the view ahead of the player's warplane (the moving direction of the player's warplane) as seen from a predetermined position in the rear of the player's warplane.

Figure 3:
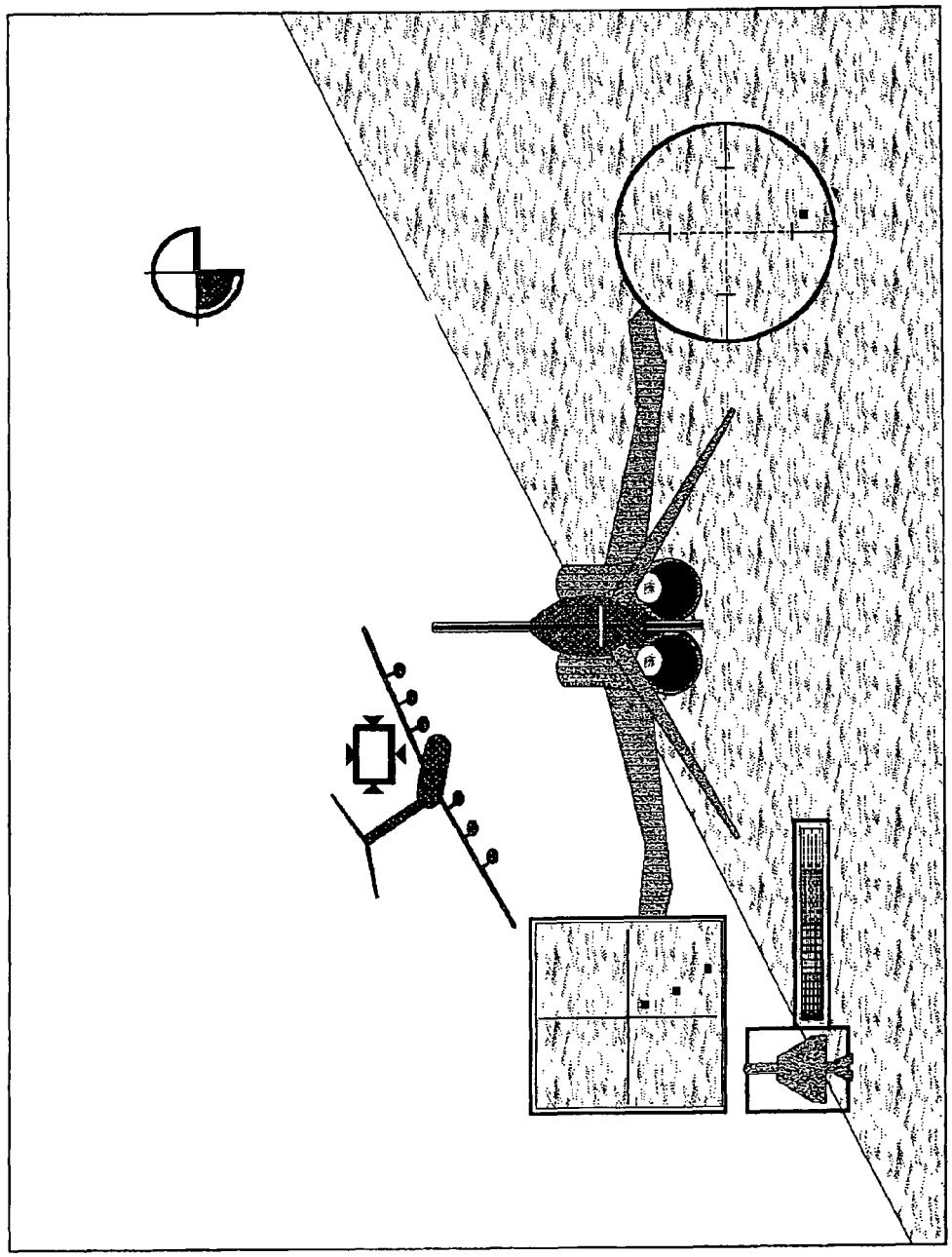
FIG. 3 is an exemplary diagram showing an example of a battle image generated.

For example, in a case where the player's warplane is pursuing an enemy warplane by making a left turn, the image generation unit 206 generates an image of the view ahead as seen from the rear of the player's warplane set in a turning posture, as shown in FIG. 3.

The image processing unit 108 can function as the image generation unit 206 described above.

The image display unit 207 displays the images sequentially generated by the image generation unit 206.

That is, the image display unit 207 displays an image of the virtual space as shown in FIG. 3, seen from a viewpoint based on the player's warplane.

The monitor connected to the image processing unit 108 can function as the image display unit 207 described above.

Returning to FIG. 2, the audio data storage unit 208 stores a plurality of audio data corresponding to progress statuses of the battles, winning and losing statuses of the friend and enemy sides.

For example, the audio data storage unit 208 stores audio data for explicitly indicating changes, etc. in the battle progress statuses, and audio data (for example, speeches, etc.) for implicitly indicating the winning and losing statuses of the friend and enemy sides.

Specifically, the audio data storage unit 208 stores audio data for explicitly indicating changes, etc. of the progress statuses as shown in FIG. 4A, and stores audio data (for example, speeches, etc.) for implicitly indicating the winning and losing statuses as shown in FIG. 4B.

The priority orders in the drawings are values indicating the degree of output priority. Specifically, in a case where a plurality of audio data are sent to the queue buffer 210 described later, they are output in the order of high priority (in the order of arrival for equal values) by the audio output unit 212 described later. Here, a smaller priority value indicates a higher priority.

Further, comparing the priority orders of the audio data in FIG. 4A and FIG. 4B, the priority orders in FIG. 4A are set to smaller values than the priority orders in FIG. 4B. That is, the audio data for explicitly indicating the progress statuses in FIG. 4A are given higher priority orders than the audio data for implicitly indicating the winning and losing statuses in FIG. 4B.

That is, it can be said that the audio data in FIG. 4A and the audio data in FIG. 4B are in the relationship of main data and sub data.

The life duration times in the drawings are values designating the time for which the audio data can be retained in the queue buffer 210. Specifically, if audio data having a life duration time set is kept in the queue buffer 210 without being output and the life duration time has passed, the audio data is deleted (cleared from the queue) by the life duration management unit 211 described later. That is, when the life duration time passes, the audio data is deleted from the queue buffer 210 and does not remain as an object of audio output. Note that the values of life duration time are set for only the audio data in FIG. 4B, and no life duration times are set for the audio data in FIG. 4A.

That is, since the audio data in FIG. 4A are the main audio data, the audios are not deleted but output even if some time is taken for them to be output. On the other hand, the audio data in FIG. 4B are sub audio data, and the audios are thus deleted without being output when the life duration time passes.

The DVD-ROM attached on the DVD-ROM drive 107, the external memory 106, or the like can function as the audio data storage unit 208 described above.

Returning to FIG. 2, the audio data acquisition unit 209 acquires corresponding audio data from the audio data storage unit 208 based on a battle situation detected by the battle situation detection unit 205.

That is, the audio data acquisition unit 209 acquires audio data specified based on the progress status of the battle from the audio data in FIG. 4A. For example, in a case where the battle situation detection unit 205 detects an enemy warplane being defeated, the audio data acquisition unit 209 acquires audio data of a content that "our side defeated an enemy plane!" specified based on the progress status from among the audio data in FIG. 4A.

Further, the winning and losing statuses of the friend and enemy sides are detected at each predetermined timing (for example, once in each fixed cycle, or at each timing calculated randomly), and the audio data acquisition unit 209 acquires arbitrary corresponding audio data from the audio data in FIG. 4B based on the detected winning and losing statuses. For example, in a case where the battle situation detection unit 205 detects a winning status of the friend side (a losing status of the enemy side), the audio data acquisition unit 209 acquires any audio data that matches the winning status of the friend side such as "we can go on!" "it feels like we're getting into the swing of it!", "the drills are paying off!" among the audio data in the audio data in FIG. 4B.

The audio data acquisition unit 209 sends the audio data acquired in this manner to the queue buffer 210 together with the priority order. In a case where a life duration time is set for the audio data, the audio data acquisition unit 209 feeds the information of the life duration time to the life duration management unit 211.

The CPU 101 can function as the audio data acquisition unit 209 described above.

The queue buffer 210 is a queue area to which, for example, priority orders can be set, and temporarily retains audio data which is transmitted together with a priority order from the audio data acquisition unit 209. Then, the queue buffer 210 supplies the retained audio data to the audio output unit 212. At this time, if the queue buffer 210 retains a plurality of audio data, it supplies the audio data to the audio output unit 212 in the order of high priority (in the order of arrival for equal values).

When the queue buffer 210 is instructed by the life duration management unit 211 to delete audio data (clear audio data from the queue) whose life duration time has passed, it clears the corresponding audio data retained therein.

The RAM 103 or the like can function as the queue buffer 210 described above.

The life duration management unit 211 has a clocker function, and manages elapse of the life duration time of audio data retained in the queue buffer 210.

For example, when the life duration management unit 211 is supplied from the audio data acquisition unit 209 with information on life duration time of audio data which is sent to the queue buffer 210, it starts clocking the life duration time. Then, when the life duration time passes with no audio output, the life duration management unit 211 deletes the audio data from the queue buffer 210.

The CPU 101 or the like can function as the life duration management unit 211 described above.

The audio output unit 212 outputs audios based on audio data.

For example, when the audio output unit 212 reads out audio data from the queue buffer 2 10 based on the priority orders, it synthesizes an audio signal from the read-out audio data, and outputs audios from a predetermined speaker.

The audio processing unit 109 or the like can function as the audio output unit 212 described above.

Figure 5:
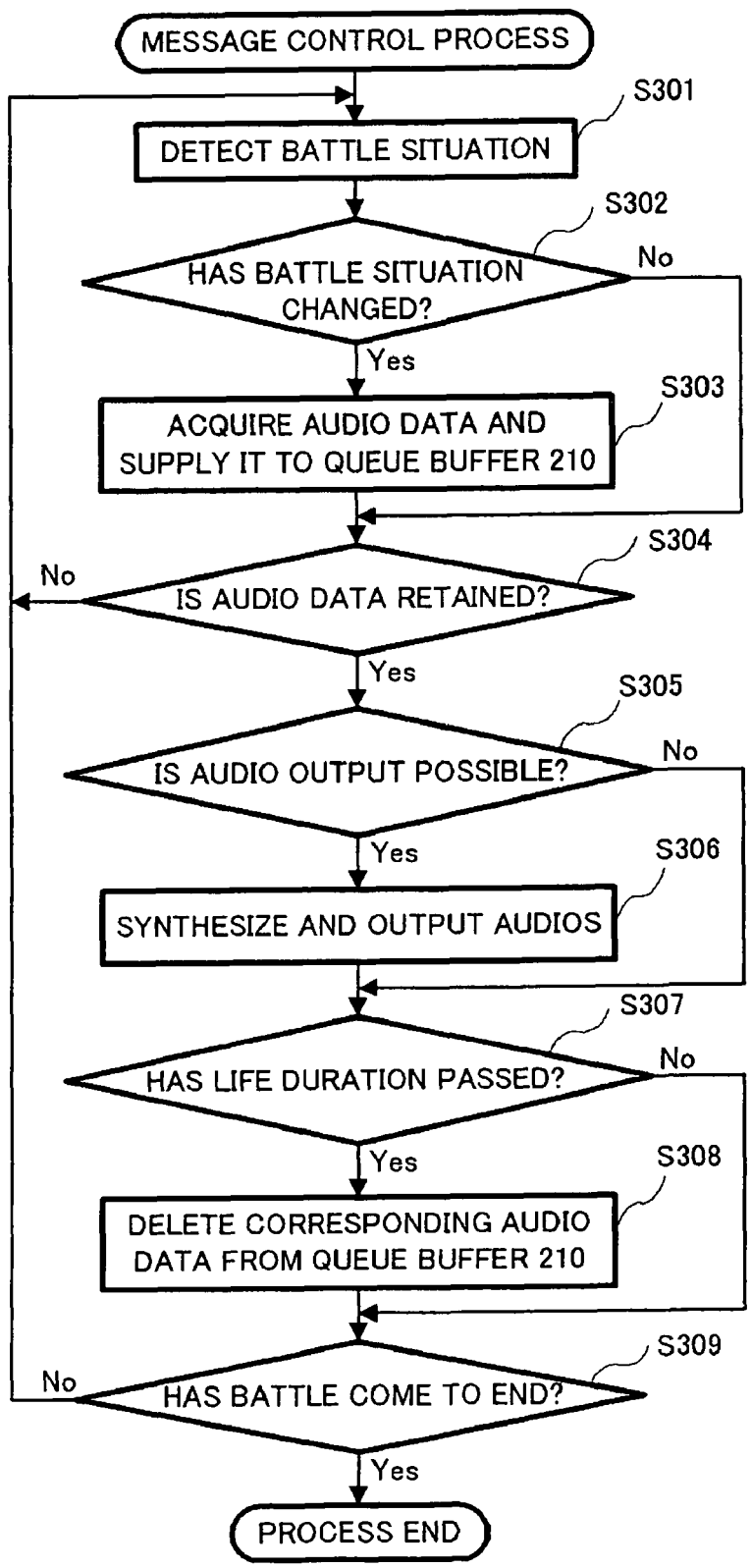
FIG. 5 is a flowchart showing a flow of control of a message control process performed by the message output device.

FIG. 5 is a flowchart showing the flow of a message control process performed by the message output device 200. The following explanation will be made with reference to this drawing. Note that the message control process will be started when, for example, the player operates the controller 105 and instructs a group battle between the friend warplane group and the enemy warplane group.

When the message control process is started, the battle situation detection unit 205 detects the battle situation (step S301). That is, the battle situation detection unit 205 detects presence/absence, etc. of changes in the progress status of the battle controlled by the battle control unit 204, and winning and losing statuses of the friend and enemy sides. Note that the battle situation detection unit 205 detects the winning and losing statuses of the friend and enemy sides, for example, at each predetermined timing.

The battle situation detection unit 205 determines whether or not the battle situation has changed (step S302). For example, in a case where there is a change in the progress status of the battle, or the timing to detect the winning and losing statuses of the friend and enemy sides has come, the battle situation detection unit 205 determines that the battle situation has changed.

In a case where it is determined that the battle situation has not changed (step S302; No), the message output device 200 moves the process to step S304 described later.

To the contrary, in a case where it is determined that the battle situation has changed (step S302; Yes), the audio data acquisition unit 209 acquires corresponding audio data from the audio data storage unit 208, and supplies it to the queue buffer 210 (step S303).

For example, in a case where the progress status of the battle has changed, the audio data acquisition unit 209 acquires audio data specified based on the progress status from among the audio data shown in FIG. 4A.

Further, in a case where the timing to detect the winning and losing statuses of the friend and enemy sides has come, the audio data acquisition unit 209 acquires corresponding arbitrary audio data from among the audio data shown in FIG. 4B based on the detected winning and losing statuses.

Then, the audio data acquisition unit 209 sends the acquired audio data together with its priority order to the queue buffer 210. Further, in a case where any life duration time is set for the audio data, the audio data acquisition unit 209 supplies the information on the life duration time to the life duration management unit 211 to request it to manage the life duration time.

The message output device 200 determines whether or not the queue buffer 210 retains any audio data (step S304).

In a case where it is determined that the queue buffer 210 retains no audio data (step S304; No), the message output device 200 returns the process to step S301, and repeatedly performs the above-described steps S301 to S304.

To the contrary, in a case where it is determined that the queue buffer 210 retains any audio data (step S304; Yes), the message output device 200 determines whether or not the audio output unit 212 can perform new audio output (step S305).

For example, the message output device 200 determines that the audio output unit 212 can perform new audio output in a case where the audio output unit 212 is not currently outputting any audios, and determines that the audio output unit 212 cannot perform new audio output in a case where the audio output unit 212 is currently outputting audios crosswise.

In a case where it is determined that audio output cannot be performed, the message output device 200 moves the process to step S307 described later.

To the contrary, in a case where it is determined that audio output can be performed, the audio output unit 212 reads out audio data from the queue buffer 210 and outputs audios based on the audio data (step S306). That is, the audio output unit 212 reads out audio data based on the priority order from the queue buffer 210, synthesizes an audio signal from the read-out audio data, and outputs the audios from the predetermined speaker.

The life duration management unit 211 determines whether or not the life duration time it is managing has passed (step S307). That is, the life duration management unit 211 determines whether or not there is any audio data whose life duration time has passed before the audios are output.

In a case where it is determined that there is no audio data whose life duration time has passes (step S307; No), the message output device 200 moves the process to step S309 described later.

To the contrary, in a case where it is determined that there is any audio data whose life duration time has passed (step S307; Yes), the life duration management unit 211 deletes the corresponding audio data from the queue buffer 210 (step S308).

The message output device 200 determines whether or not the battle has come to an end (step S309). For example, in a case where the friend warplane group or the enemy warplane group is completely beaten or a predetermined time limit has passed, the message output device 200 determines that the battle has come to an end.

In a case where it is determined that the battle has not yet come to an end, the message output device 200 returns the process to step S301, and repeatedly performs the above-described steps S301 to S309.

To the contrary, in a case where it is determined that the battle has come to an end, the message output device 200 terminates the message control process.

By the above-described message control process, the winning and losing statuses of the friend and enemy sides are detected at each predetermined timing, and audios based on audio data implicitly indicating the winning and losing statuses are output.

Since this ensures that the audios matching the winning and losing statuses of the friend and enemy sides continue to be sequentially output, even in a case where the winning and losing statuses of the friend and enemy sides change like a swinging pendulum, the player can grasp how the changes are like.

Note that in a case where any change is caused in the progress status of the battle at the same time, audios explicitly indicating the change in the progress status are output preferentially over the audios implicitly indicating the winning and losing statuses. Therefore, the player can be notified of audios explicitly indicating the change in the progress status, which is more important.

Further, audio data whose life duration time has passed while it remains retained in the queue buffer 210 is to be deleted without being output. Therefore, it is possible to prevent any audio data from being retained unnecessarily.

As described above, according to the present embodiment, it is possible to easily notify the winning and losing statuses of the friend and enemy sides. And it is possible to give the player more reality and live sense.

Another Embodiment

In the above-described embodiment, a case has been explained in which audio output is employed for notifying the player of the winning and losing statuses of the friend and enemy sides. However, the manner for notifying the winning and losing statuses to the player is not limited to audio output, but arbitrary. For example, the winning and losing statuses may be notified to the player by displaying characters, etc.

Further, the winning and losing statuses may be notified to the player by utilizing both audio output and display of characters, etc.

Figure 6:
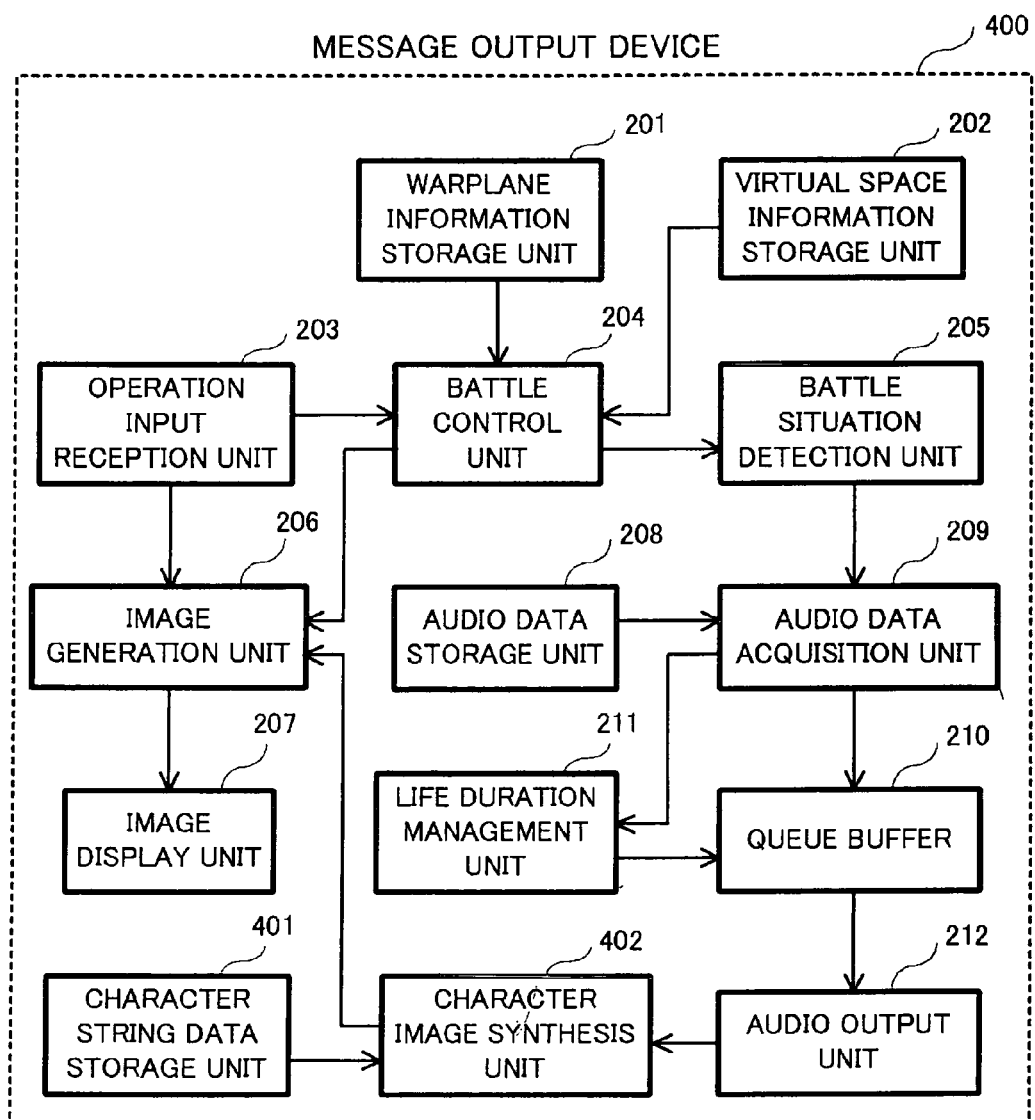
FIG. 6 is an exemplary diagram showing an example of a schematic structure of a message output device according to another embodiment.

FIG. 6 is an exemplary diagram showing a schematic structure of a message output device 400 according to another embodiment. The following explanation will be made with reference to this drawing.

The message output device 400 is structured by adding a character string data storage unit 401 and a character image synthesis unit 402 to the above-described message output device 200 in FIG. 2. That is, the warplane information storage unit 201 to the audio output unit 212 are structured in the same way as in the above-described message output device 200.

The character string data storage unit 401 stores character string data which has the same content as each audio data (wording) stored in the audio data storage unit 208. That is, the character string data storage unit 401 stores character string data which is the same as the audio data (content) as shown in FIG. 4A and FIG. 4B mentioned above.

The character image synthesis unit 402 reads out character string data corresponding to audio data the audio output unit 212 reads out from the queue buffer 210 from the character string data storage unit 401, and generates a character image. Then, the character image synthesis unit 402 synthesizes the generated character image with an image generated by the image generation unit 206.

Figure 7:
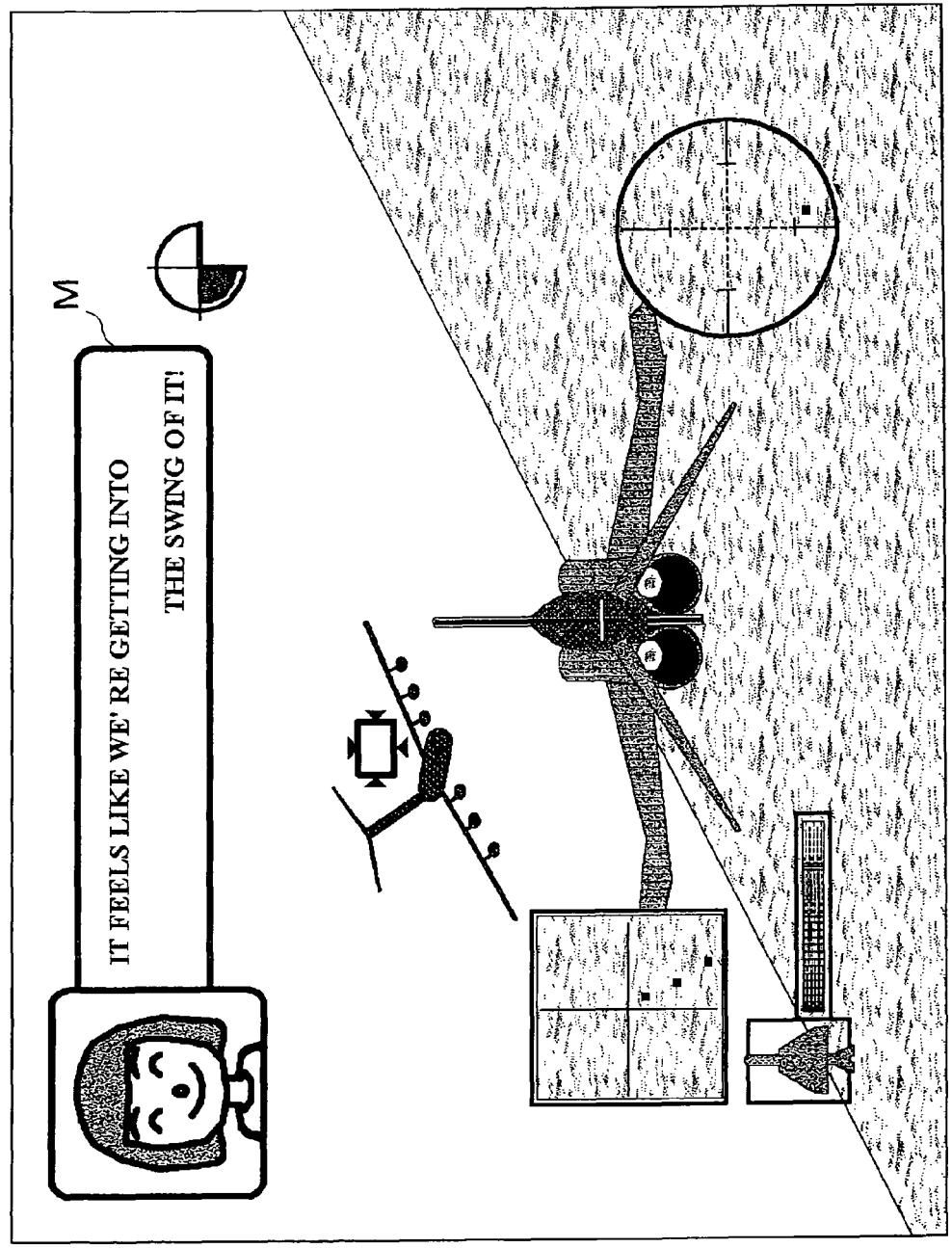
FIG. 7 is an exemplary diagram showing an example of a battle image on which display data corresponding to audios to be output is synthesized.

For example, the character image synthesis unit 402 generates a character image M as shown in FIG. 7, and does it on the image generated by the image generation unit 206.

That is, in case of FIG. 7, in a case where the battle situation detection unit 205 detects a winning status of the friend side (a losing status of the enemy side), the audio data acquisition unit 209 acquires, for example, the audio data "it feels like we're getting into the swing of it!" from among the audio data shown in FIG. 4B. Then, when this audio data is sent to the queue buffer 210 and thereafter read out by the audio output unit 212, the character image synthesis unit 402 reads out character string data corresponding to this audio data from the character string data storage unit 401, generates the character image M, and synthesizes it with the image generated by the image generation unit 206. Further, the audio output unit 212 outputs audios "it feels like we're getting into the swing of it!" based on the read-out audio data.

In this manner, the message output device 400 notifies the player of the winning and losing statuses by utilizing both audio output and display of characters, etc. Also in this case, it is possible to easily notify the winning and losing statuses of the friend and enemy sides. Further, it is possible to give the player more reality and live sense.

Another Embodiment

In the above-described embodiment, a case has been explained in which the audio data storage unit 208 stores audio data for explicitly indicating changes, etc. in the progress status and audio data for implicitly indicating the winning and losing statuses. However, the audio data stored in the audio data storage unit 208 are not limited to these, but arbitrary. For example, the audio data storage unit 208 may store audio data arising upon an operation instruction (flight instruction and attack instruction) from the player.

In the above-described embodiment, a case has been explained in which priority order, etc. are set for the audio data to adjust the order of audio output. However, the audio data may be given other settings to make further adjustments to the order of output. For example, group codes, etc. may be set for the audio data so that the audios may be output in group unit.

In the above-described embodiment, a case has been explained in which the invention is applied to a flight combat action game, but the invention can be arbitrarily applied to a sports action game, etc. for football, baseball, etc. played in groups.

For example, reverse situations such as home and away can occur in football, baseball, etc. For example, in case of a home game, if audios such as booing, invectives, etc. against the away team are output at each predetermined timing, more reality and live sense can be given to the player.

This application is based on Japanese Patent Application No. 2004-006707, and the disclosure of this base application is incorporated herein by reference in its entirety.

Industrial Applicability

As explained above, according to the present invention, it is possible to provide a message output device and a message control method suitable for easily notifying the winning and losing statuses of the opposing parties, a program for realizing these on a computer, and a computer-readable information recording medium storing the program.

What is claimed is:

1. A message output device, comprising:
    a battle control unit which controls a battle between characters belonging to opposing friend and enemy sides in a virtual space based on a predetermined instruction input;
    a message storage unit which stores a plurality of main messages matching progress statuses of the battle, and a plurality of sub messages matching winning and losing statuses of the friend and enemy sides;
    a main message acquisition unit which acquires a main message specified in accordance with a progress status of the battle;
    a sub message acquisition unit which detects winning and losing statuses of the friend and the enemy sides which change in accordance with a progress status of the battle at each predetermined timing, and acquires a sub message matching the winning and losing statuses that are detected;
    a message output unit which outputs, based on a predetermined condition, the main message acquired by the main message acquisition unit and the sub message acquired by the sub message acquisition unit; and
    a retaining unit that at least temporarily retains the sub message acquired by the sub message acquisition unit;
    wherein a life duration time is set at least for each sub message retained in the retaining unit;
    a message deletion unit that deletes, from among the sub messages retained in the retaining unit, a sub message whose life duration time has expired without outputting the sub message,
    a priority order is set for each main message and each sub message; and
    the message output unit outputs, in an order based on the priority order, the acquired main message and the sub message having been retained in the retaining unit.

2. The message output device according to claim 1, wherein in a case where the main message and the sub message are acquired at a same time, the message output unit outputs the main message preferentially.

3. A message output device comprising:
    a battle control unit which controls a battle between characters belonging to opposing friend and enemy sides in a virtual space based on a predetermined instruction input;
    a message storage unit which stores a plurality of main messages matching progress statuses of the battle, and a plurality of sub messages matching winning and losing statuses of the friend and enemy sides;
    a main message acquisition unit which acquires a main message specified in accordance with progress of the battle controlled;
    a sub message acquisition unit which detects winning and losing statuses of the friend and enemy sides which change in accordance with the progress of the battle controlled at each predetermined timing, and acquires an arbitrary sub message matching the winning and losing statuses that are detected;
    a retaining unit which temporarily retains the main message acquired by the main message acquisition unit and the sub message acquired by the sub message acquisition unit; and
    a message output unit which outputs, based on a predetermined condition, the main message and the sub message having been retained in the retaining unit,
    wherein a life duration time is set for each main message and each sub message, and
    a message deletion unit which deletes, from among the sub messages retained in the retaining unit, a sub message whose life duration time has expired without outputting the sub message, is further provided.

4. A message control method utilizing a message storage unit and a retaining unit, where the message storage unit stores a plurality of main messages matching progress statuses of a battle, and a plurality of sub messages matching winning and losing statuses of friend and enemy sides, the method comprising:
    a battle controlling step of controlling a battle between characters belonging to friend and enemy sides in a virtual space based on a predetermined instruction input;

a main message acquiring step of acquiring a main message specified in accordance with progress of the battle controlled;

a sub message acquiring step of detecting winning and losing statuses of the battle which change in accordance with the progress of the battle controlled at each predetermined timing, and acquiring an arbitrary sub message matching the winning and losing statuses that are detected;

a message outputting step of outputting, based on a predetermined condition, the main message acquired in the main message acquiring step and the sub message acquired in the main message acquiring step; and a storing step of temporarily storing in the retaining unit the sub message acquired in the sub message acquisition step;

wherein a life duration time is set at least for each sub message retained in the retaining unit, a message deleting step of deleting, from among the sub messages retained in the retaining unit, a sub message whose life duration time has expired without outputting the sub message, a priority order is set for each main message and each sub messages; and the message output step outputs, in an order based on priority orders, the acquired main message and the sub message having been retained in the retaining unit.

5. A non-transitory computer-readable information recording medium storing a program for controlling a computer to function as:

a battle control unit which controls a battle between characters belonging to opposing friend and enemy sides in a virtual space based on a predetermined instruction input;

a message storage unit which stores a plurality of main messages matching progress statuses of the battle, and a plurality of sub messages matching winning and losing statuses of the friend and enemy sides;

a main message acquisition unit which acquires a main message specified in accordance with progress of the battle controlled;

a sub message acquisition unit which detects winning and losing statuses of the friend and enemy sides which change in accordance with the progress of the battle controlled at each predetermined timing, and acquires an arbitrary sub message the winning and losing statuses that are detected;

a message output unit which outputs, based on a predetermined condition, the main message acquired by the main message acquisition unit and the sub message acquired by the sub message acquisition unit; and a retaining unit that at least temporarily retains the sub message acquired by the sub message acquisition unit, wherein a life duration time is set at least for each sub message retained in the retaining unit, a message deletion unit that deletes, from among the sub messages retained in the retaining unit, a sub message whose life duration time has expired without outputting the sub message, a priority order is set for each main message and each sub message; and the message output unit outputs, in an order based on the priority order, the acquired main message and the sub message having been retained in the retaining unit.

\* \* \* \* \*